May 5, 1942.  C. F. ENGELHARDT  2,281,873
PISTON RING
Filed Sept. 8, 1938  5 Sheets-Sheet 1
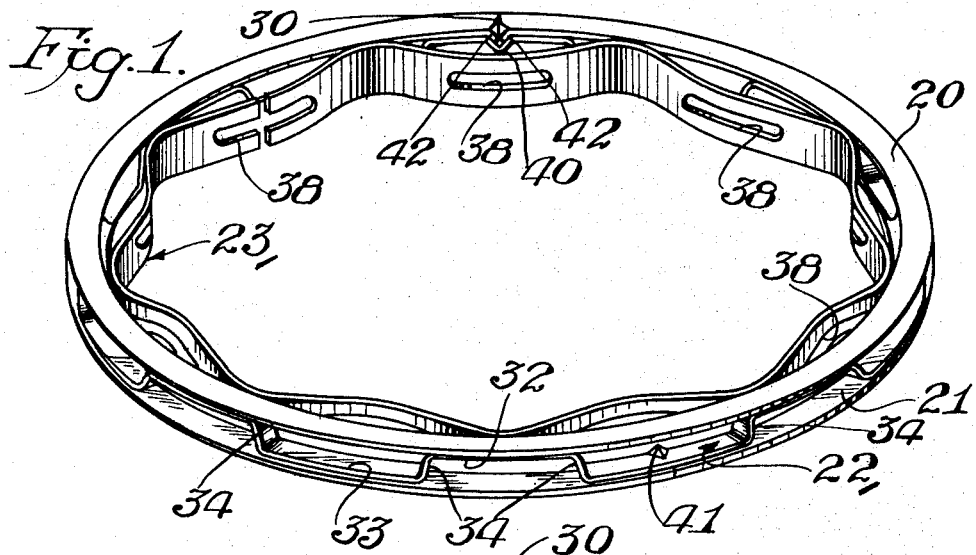
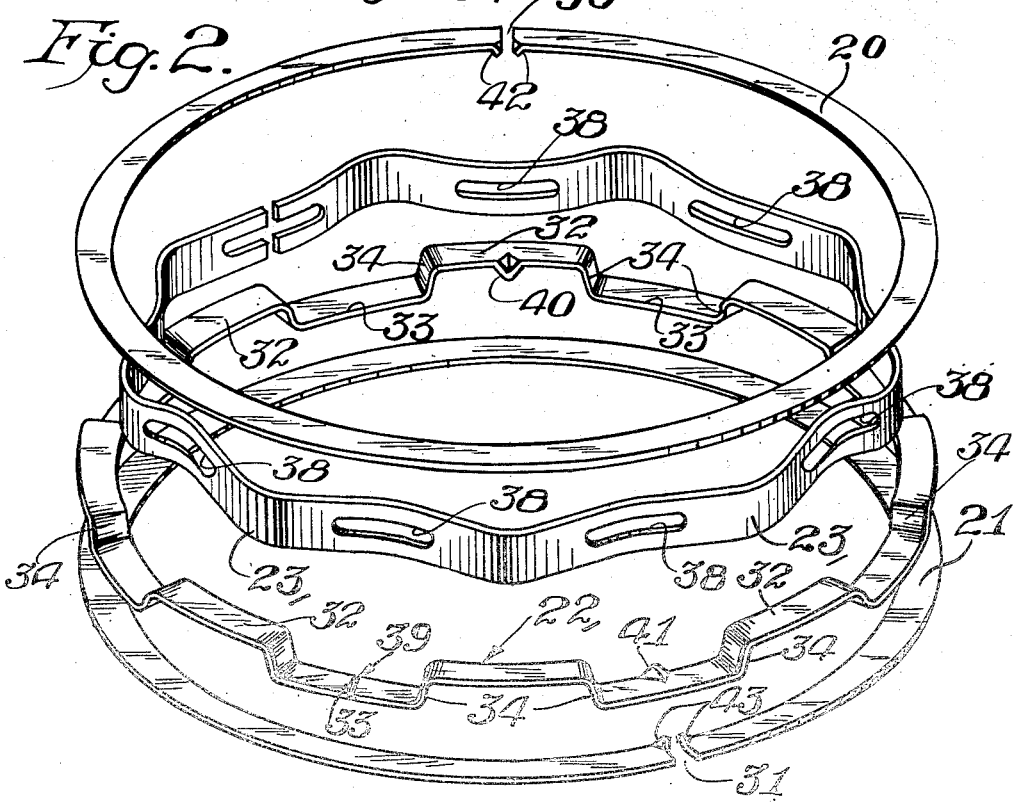
INVENTOR
Carl F. Engelhardt
BY
Lenard L. Kalish
ATTORNEY May 5, 1942.     C. F. ENGELHARDT     2,281,873
PISTON RING
Filed Sept. 8, 1938     5 Sheets-Sheet 2
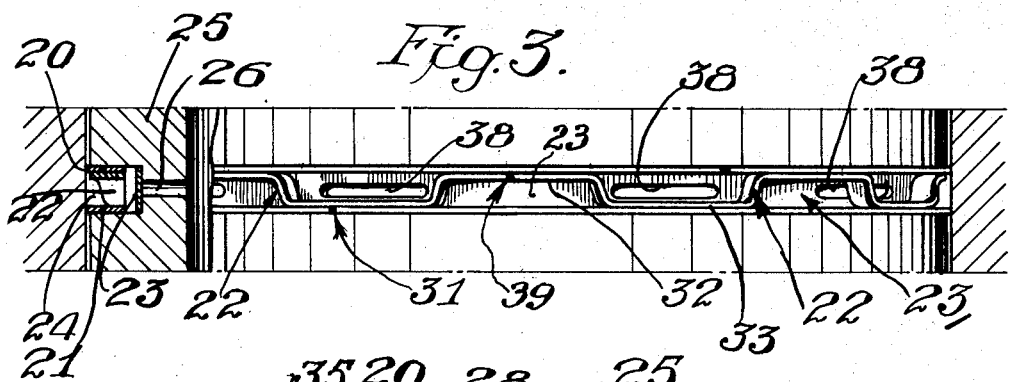
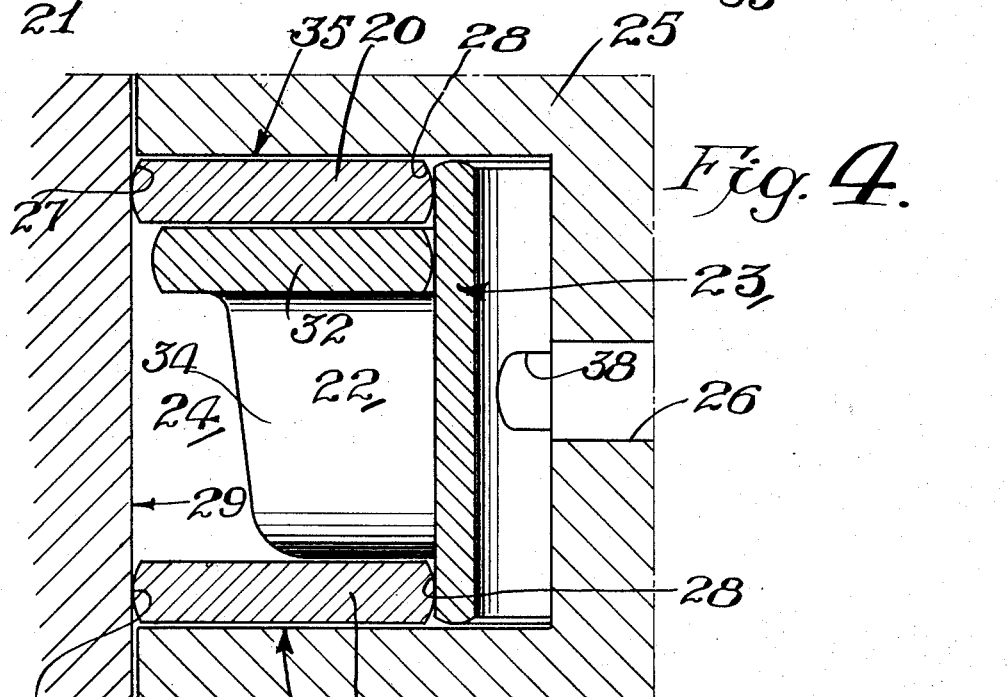
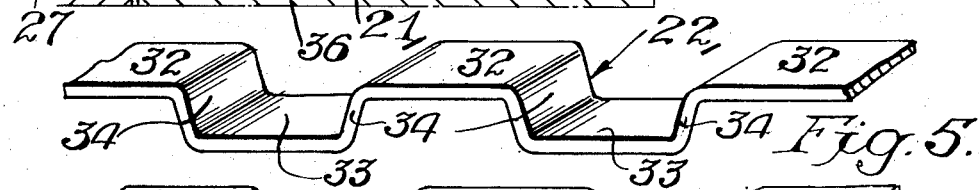
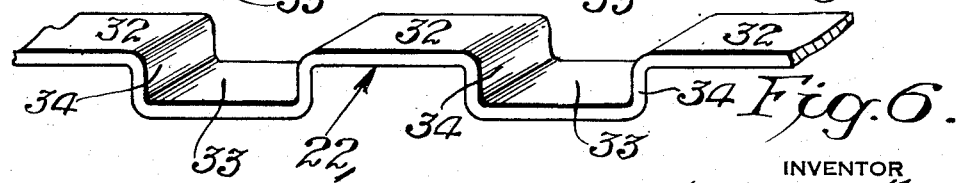
INVENTOR
Carl F. Engelhardt
BY
Leonard L. Kalish
ATTORNEY May 5, 1942. C. F. ENGELHARDT 2,281,873
PISTON RING
Filed Sept. 8, 1938 5 Sheets-Sheet 3
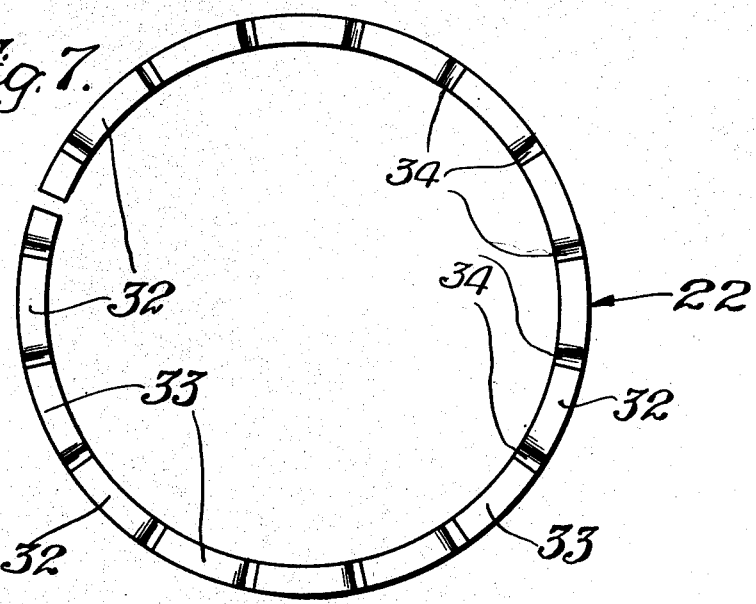
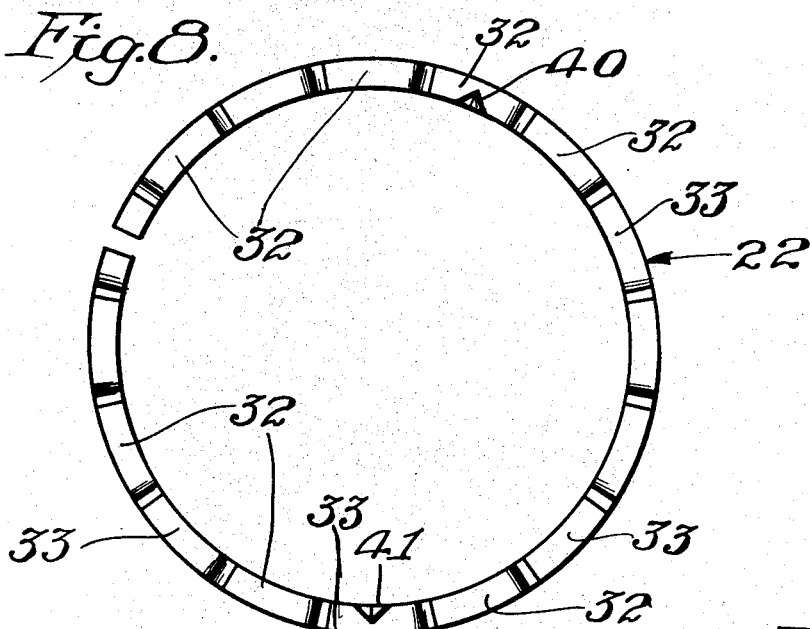
INVENTOR
Carl F. Engelhardt
BY Leonard L. Kalish
ATTORNEY May 5, 1942.   C. F. ENGELHARDT   2,281,873
PISTON RING
Filed Sept. 8, 1938   5 Sheets-Sheet 4

INVENTOR.
Carl F. Engelhardt
BY Leonard L. Kalish
ATTORNEY.

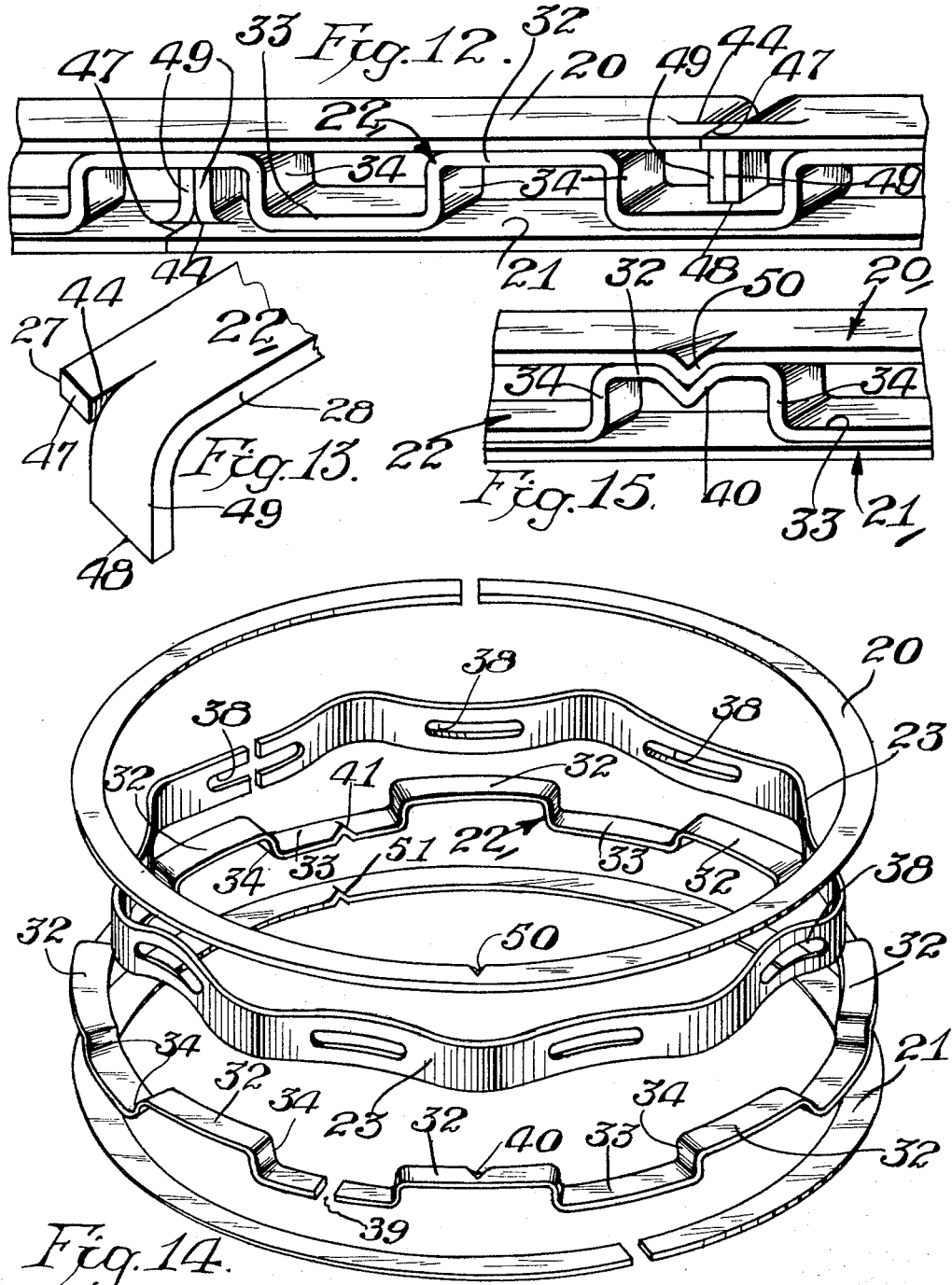

Patented May 5, 1942

2,281,873

UNITED STATES PATENT OFFICE 2,281,873

PISTON RING

Carl F. Engelhardt, Yeadon, Pa., assignor to Wilkening Manufacturing Company, Philadelphia, Pa., a corporation of Delaware Application September 8, 1938, Serial No. 228,998

6 Claims. (Cl. 309—45)

The present invention relates to a certain new and useful piston ring and it relates more particularly to oil-control piston rings for use in ring-receiving grooves of pistons, particularly pistons of internal combustion engines.

One of the objects of the present invention is to provide a piston ring which will effectively control the oil in the cylinder surfaces of internal combustion engines, and particularly over a wide range of engine speeds and operating conditions and which will be effective also for cylinders which are slightly or badly worn. The piston ring of the present invention is intended for use chiefly in drilled or apertured ring-receiving grooves of pistons, that is, the ring-receiving grooves which are provided with one or more holes or apertures extending through the piston wall into the interior of the piston, through which apertures or holes the oil may be drained back into the crank case of the engine, although it may also be used for compression purposes in imperforate ring-receiving grooves of pistons.

Other objects and advantages of the present invention will appear more fully from the following detailed description.

For the purpose of illustrating the invention, there is shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

In the accompanying drawings in which like reference characters indicate like parts:

Figure 1 represents a perspective view of one embodiment of the present invention.

Figure 2 represents a similar perspective view with the component parts of the piston ring separated somewhat so as more fully to expose them to view.

Figure 3 represents a fragmentary sectional view of a cylinder and piston, showing the piston ring of the present invention mounted therein.

Figure 4 represents a much enlarged cross-sectional view of a fragmentary portion of a cylinder wall and piston and of one embodiment of the piston ring of the present invention; drawn on a scale of twenty to one.

Figure 5 represents a fragmentary development view of one embodiment or form of the corrugated spacer ring forming part of the piston ring of the present invention.

Figure 6 represents a similar fragmentary development view of another embodiment or form of the corrugated separator or spacer ring forming part of the piston ring of the present invention.

Figure 7 represents a top plan view of a corrugated separator ring without the notches indicated in Figures 1 and 2.

Figure 8 represents a top plan view of a corrugated separator ring with the notches indicated in Figures 1 and 2 (and also indicated in Figures 14 and 15).

Figure 9 represents a fragmentary elevational view, on an enlarged scale, of the piston ring embodying the present invention, particularly illustrating (on the enlarged scale) the interlocking between the sealing rings and the spacer ring.

Figure 12 represents a fragmentary perspective view of a portion of the piston ring shown in Figures 10 and 11, on a larger scale, however, and also shown as though the component parts were straight instead of being curved as they actually are.

Figure 13 represents a fragmentary perspective view of one of the terminals of one of the sealing rings in the embodiment shown in Figures 10, 11 and 12.

Figure 14 represents a perspective view with the component parts of the piston ring separated somewhat so as more fully to expose them to view, of a still further embodiment of the present invention.

Figure 15 represents an enlarged fragmentary perspective view of a portion of the piston ring shown in Figure 14 and with the portions indicated as though they are straight pieces instead of being curved as they actually are in practice and as they are actually shown in Figure 14.

Figure 10:
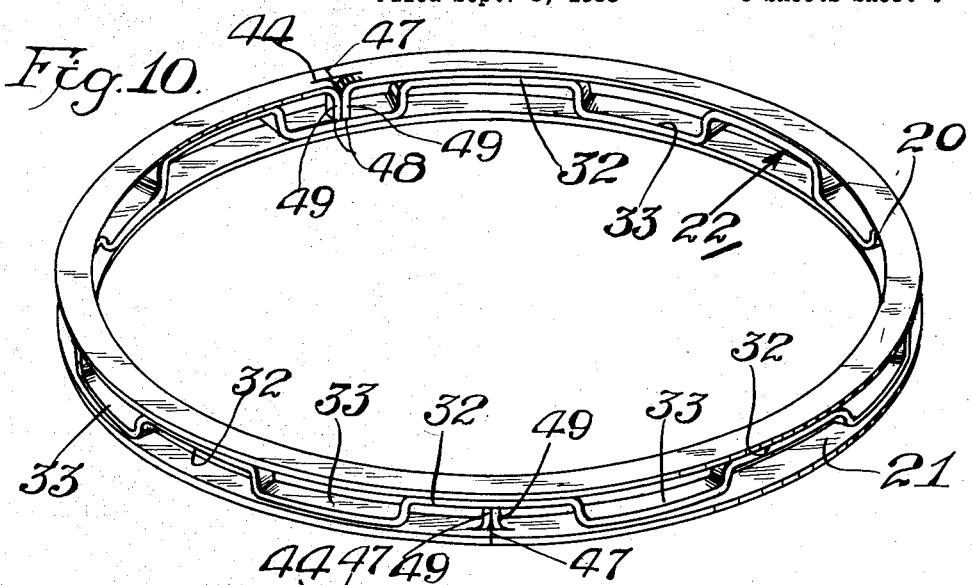
Figure 10 represents a perspective view (similar to that shown in Figure 1) of another embodiment of the piston ring of the present invention.
Figure 11:
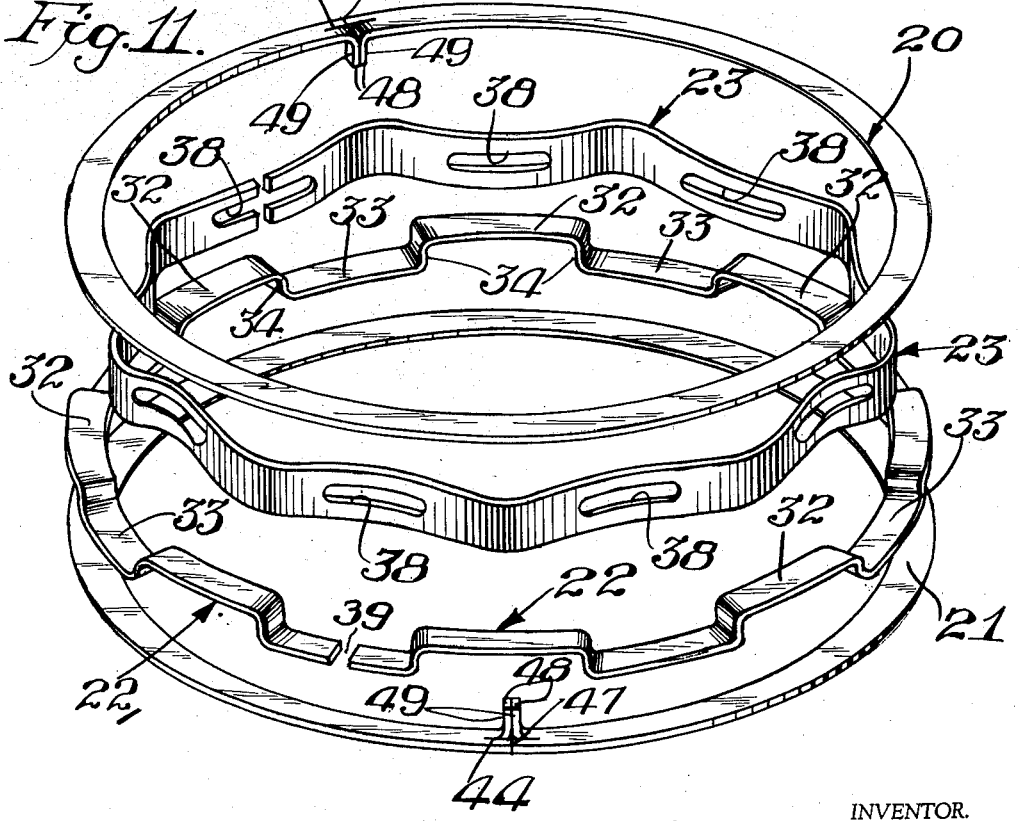
Figure 11 represents a similar perspective view with the component parts of the piston ring separated somewhat so as more fully to expose them to view.

According to one embodiment of the present invention, I provide a composite piston ring including a pair of similar flat tempered steel sealing rings or members 20 and 21, respectively, an intermediate corrugated steel separator or spacer member 22 and a corrugated steel expander member 23; all disposed within the same ring-receiving groove 24 of a piston 25 (provided with a series of circumferentially distributed oil-drain apertures 26 through the piston wall).

The generally flat annular steel sealing members 20 and 21 are formed of suitable flat, ribbon-like bands of steel which may be curved to shape by suitable means and methods already known in the art. The flat ribbon steel of which the annular members 20 and 21 are formed are generally provided with their marginal edges 27 and 28 very slightly rounded, thereby reducing the area of the contact with the cylinder wall 29. The amount of rounding shown in Figure 4 of the drawings may be somewhat greater than what would be used in actual practice, and this showing is for purposes of illustration.

The generally annular sealing members 20 and 21 may be so set as normally to tend to leave the gaps 30 and 31 open to a greater or lesser extent (⅛" to ⅜") when not compressed within the cylinder wall as indicated in Figure 2, and so that when compressed or contracted within the cylinder wall in the position indicated in Figures 1 and 3, the gap will just close, or substantially close, as shown in Figures 1 and 3. However, the amount of the "free" opening at the gaps 30 and 31 is not altogether important because the outward radial expansion of the sealing members 20 and 21 is accomplished chiefly through the expander member 23 in the manner indicated particularly in Figures 1 and 4.

The separator or spacer member 22 is formed of similar flat ribbon-like steel strips by either pressing between complete dies or by corrugating between suitable rotary corrugated dies or by other suitable means or methods known in the arts for corrugating flat metals of this character. The (radial) width of the ribbon of which the spacer or separator member 22 is formed is preferably (though not necessarily) slightly less than the (radial) width of the ribbon-like steel strips of which the annular sealing members 20 and 21 are formed (as indicated particularly in Figure 4) so that the separator or spacer member 22 will not be forced into contact with the cylder wall 29 by the expander spring 23, but so that it may instead assume a receded position, as indicated particularly in Figure 4 (and as also intended to be indicated in the other figures, such as 1, 10, 12 and 15).

Alternatively, the corrugated spacer member 22 may be made of a radial width the same as, or only very slightly, perhaps a few thousandths (.0005" to .005") less in radial width than the sealing members 21 and 22, so that the spacer member 22 will also contact or bear against the cylinder wall either from the outset, as where the radial width is the same as that of the sealing members 20 and 21, or after the sealing members have been run in for some time or worn in for the difference between the radial widths of the sealing members and the spacer member. Thus, by making the spacer member of a radial width one thousandths or so less than the radial width of the sealing members 20 and 21, the radial expanding forces of the expander spring 23 are withheld, or substantially withheld, from the spacer member 22 until after the sealing members have been "worn in," that is, until the engine has been run for some time with the rings, when the wear on the sealing members 20 and 21 brings on three members 20, 21 and 22 the same radial width. Also alternatively, the spacer member 22 may be formed with a substantial free opening at its gap so that when compressed into the circumference of the cylinder wall, the spacer member 22 will tend to expand against the cylinder wall by the tension set up within it by such compression. This inherent radial expansion of the spacer member itself will bring it into contact with the cylinder wall with less force than that which would be exerted by the expander spring 23, although this inherent expansive force may be augmented by the action of the expander spring 23 upon the spacer member 22 under the conditions hereinabove described.

The corrugations in the separator or spacer members 22 are provided with alternately opposed and staggered flat portions 32 and 33, with intervening transverse portions 34. The planes of the transverse portions 34 are preferably (though not necessarily) as nearly at a right angle to the planes of the longitudinal flat portions 32 and 33 as it may be possible to form them with dies or corrugating rolls or the like, as for instance indicated more particularly in the schematic showing of Figure 6; although in practice these transverse portions 34 are at a slight angle, which angle is shown slightly exaggerated in the schematic drawing of Figure 5. The more the transverse portions 34 are inclined away from the vertical or right-angular position, the more the spacer member will be possessed of axial compressibility or resiliency (that is, other things such as thickness of metal, temper, etc., being equal).

By shortening the corrugations and by correspondingly increasing their number within the circumference of the spacer member 22, a sufficient resistance against axial compression or axial "collapsing" (particularly at high speeds) may be obtained without either the flat portions 32 and 33 and without the more or less right-angular transverse portions 34. Thus, by shortening the circumferential dimension of the corrugations and by correspondingly increasing their number within the circumference (other things being equal), the spacer member 22 may be formed with sinuous corrugations instead of corrugations having flat portions, whereby the area of contact between the sealing members 20 and 21 and the spacer member 22 is greatly reduced as the sealing members will then merely bear against the crests of the sinuous corrugations. Likewise, by increasing either the thickness or the hardness of the metal, the corrugations may be lengthened and the transverse portions further inclined to form corrugations of a sinuous shape or approaching a sinuous shape. The resistance to axial compression or "collapsing" may also be attained or augmented by arranging the free ends of the spacer member (that is, its two ends at the gap 39) in abutting relation to each other when the spacer member 22 is at the cylinder diameter, so that the circumferential enlargement of the spacer member which would be incident to axial compression or "collapsing," is prevented by the abutment of the two free ends of the spacer member against each other. To insure this abutting relationship or to increase the area of the abutting surfaces at the gap 39, the spacer member may be made over-size (circumferentially) with sufficient excess to permit bending small terminal portions transversely in a manner similar to the bent portions 49 indicated in Figure 13, which portions may then act as abutments in respect to each other. These abutments may also be formed in the manner indicated in Figure 13 in respect to the sealing members, that is, with the outer portions of the ends left intact and only with the inner portions bent to form the abutments. With the ends of the spacer member 22 abutting each other at 39 when the spacer member is at cylinder diameter, the corrugations of the spacer member may be elongated and still maintained sinuous or approaching the sinuous shape.

The aggregate overall axial widths of the several component members 20, 21 and 22 may be either so as substantially to fill the space between the two sides 35 and 36 of the ring-receiving groove 24 (or they may be only with a normal working clearance of one-half to two thousandths of an inch) or their aggregate overall axial widths may be substantially less than the width of the ring-receiving groove, as for instance, less by four to six or seven or more thousandths of an inch, so as to leave an axial clearance in the ring-receiving groove more than the normal working clearance and thereby to produce what may be called a "loose fit." The excess axial clearance or "under-width" permits the maintenance of a layer of oil between the outer side walls of the sealing rings 20 and 21 and the corresponding side walls 35 and 36 of the ring-receiving groove when the piston ring is in operation; these layers of oil serving as a sealing medium against a blow-by of gases behind the ring.

The expander spring member 23 may also be suitably corrugated (to any suitable shape, as for instance, with alternately reversed sinuous curves or non-sinuous curves or to form a many-sided polygon with the outer points of the polygon curved) and may be provided with suitable oil-drain apertures of oil passageways 38 preferably (though not necessarily) in the inner portions which contact the inner wall or "bottom" of the ring-receiving groove. A solid expander spring may also be used.

The several component parts 20, 21, 22 and 23 of the piston ring of the present invention are all preferably formed of flat, ribbon-like spring steel suitably tempered to a suitable hardness to give each the desired resiliency or springiness or rigidity.

Separator or spaced member 22 may be so formed or "set," that the gap 39 thereof will tend normally to be closed, thereby minimizing contact between this member and the cylinder wall, or it may be so formed or "set" as to normally tend to open the gap 39, so that the spacer member will normally tend to expand itself outwardly against the cylinder wall and away from the expander spring 23.

The spacer member 22 need not necessarily be tempered and may be left in an annealed or comparatively soft condition.

Means may also be provided in piston rings of the present invention whereby the free ends of the sealing members 20 and 21 (adjacent the gaps 30 and 31) may be supported with greater certainty upon or by one of the longitudinal flat (or contact) portions 32 and 33 of the spacer member 22. In the accompanying drawings several alternative means are shown for so supporting the free ends of the sealing members 20 and 21, although it is to be understood that the piston ring of the present invention may also be utilized without embodying any of said supporting means hereinafter described.

In Figures 1 to 8 and 9, one form of supporting means are shown, comprising opposed notches 40 and 41 provided on the inner periphery of the separator member 22 (on two of the longitudinal portions thereof) and slight turned corner portions 42 and 43 at the inner corners of the free ends of the sealing members 20 and 21 which are adapted to fit into the notches 40 and 41 in the manner indicated generally in Figure 9, thereby to prevent the rotational shifting of the sealing members 20 and 21 in relation to the separator or spacer member 22 and so as to insure the free ends of the sealing members remaining on one of the flat longitudinal portions of the spacer member.

In Figures 10, 11, 12 and 13, another form of supporting means is shown, wherein the ends of the sealing members 20 and 21 may be slightly cut or split longitudinally as at 44, intermediate the cylinder-contacting periphery 27 and the inner periphery 28 thereof, with the end portions 47 of the outer periphery trimmed to form a 360° periphery, while the end portions 48 of the inner periphery are trimmed of a length greater than what would normally form a 360° periphery, so that when the inner portion 49 is bent down in the manner indicated in Figures 10, 11, 12 and 13, the bent-down portion 49 will form a supporting toe which will just meet the inner surface of one of the flat longitudinal portions (32 or 33) of the spacer member 22 as indicated particularly in Figures 10 and 12. This gives support to the free ends of the sealing members 20 and 21. The transverse supporting toes 49 may also be formed the full radial width of the sealing members 20 and 21 without splitting as at 44.

In Figures 14 and 15 still another form of supporting means is shown. In this embodiment, the anti-rotational interlock between sealing members 20 and 21 and the spacer member 22 is obtained by providing notches 50 and 51 along the inner periphery of the sealing members 20 and 21, intermediate their ends, and so spaced in relation to the notches 40 and 41 in the spacer member 22 so as to determine the positions of the free ends of the sealing members 20 and 21 upon one of the flat longitudinal surfaces of the spacer member as indicated particularly in Figure 14. This latter form of notch-interlock may have the advantage over the form shown in Figures 1, 2 and 9 in that the assembly of the piston ring in the ring-receiving groove is somewhat easier in this last described form of construction.

If desired, the length of the corrugations of the corrugated member 22 may be greatly decreased (and with the numbers of the corrugations correspondingly increased) so that the possible unsupported or overhanging free end of the sealing members 20 and 21 is thereby correspondingly reduced. Thus, for instance, the length of the corrugations may be reduced to as much as one-half (more or less) that shown in the drawings. With such reduction of the length and corresponding increase in frequency of the corrugations, the need for supporting the free ends of the sealing members 20 and 21 is reduced.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A composite all-steel oil-control piston ring for use in perforated ring-receiving grooves of pistons of internal combustion engines comprising a pair of trans-split annular ribbon-steel sealing members, an axially corrugated trans-split annular ribbon-steel spacer member intermediate said pair of sealing members presenting alternately opposed and staggered flat supporting portions to said pair of sealing members at a generally uniform radial distance from the piston-ring axis, means extending generally axially from the ends of said sealing members into one of the spaces intermediate two of said flat supporting portions, and extending into contact with the intermediate opposed supporting portion for supporting the ends of said sealing members at points intermediate two of the flat supporting portions which support the rest of the sealing member, an annular ribbon-steel expander spring disposed within the inner peripheries of said sealing members and having alternately staggered portions for contacting the innermost wall of the ring-receiving groove of the piston and for contacting the inner peripheries of said sealing members when the piston ring is mounted within the ring-receiving groove of a piston in a cylinder, thereby to exert peripherally distributed outward radial pressure upon said sealing members, and means for passing oil through said ribbon-steel expander spring.

2. In a composite piston ring, a thin, flat, trans-split annular sealing member having end-supporting toes bent transversely at its ends.

3. In a composite piston ring, a thin, flat, trans-split annular sealing member having end-supporting toes bent transversely at its ends, said end-supporting toes being of a radial width less than the radial width of said sealing member at the bending point.

4. In a composite piston ring, a thin, flat, trans-split annular sealing member having end-supporting toes bent transversely at its ends, said end-supporting toes being spaced inwardly from the cylinder-contacting peripheral portions of said ends so as to leave the ends free to abut each other at the cylinder contacting periphery of the sealing member.

5. In a composite piston ring, a thin, flat, trans-split annular sealing member having its ends split longitudinally and with end supporting toes bent transversely from a fragmentary portion of each of said ends, divided by said split.

6. A composite piston ring for use in ring-receiving grooves of pistons of internal combustion engines comprising a pair of thin, flat, trans-split annular sealing members, a substantially trans-split annular ribbon-steel spacer member intermediate said pair of sealing members presenting alternately opposed and staggered supporting portions to said pair of sealing members in a generally axial direction without exerting any axial separating force upon said pair of sealing members simultaneously at any time, means extending generally axially from the ends of said sealing members into one of the spaces intermediate two of said supporting portions of the spacer member and extending into contact with the intermediate opposed supporting portion of said spacer member, for supporting the ends of said sealing members at points intermediate two of the supporting portions of the spacer member which support the rest of the sealing member, a generally annular ribbon-steel expander spring disposed within the inner peripheries of said sealing members and having a plurality of circumferentially distributed portions for contacting the inner peripheries of said sealing members when the piston ring is mounted within the ring-receiving groove of a piston in a cylinder, thereby to exert peripherally distributed outward radial pressure upon said sealing members.

CARL F. ENGELHARDT.